March 17, 1953 H. R. WENGEN ET AL 2,631,346
MESSENGER WIRE CLAMP
Filed Dec. 29, 1949
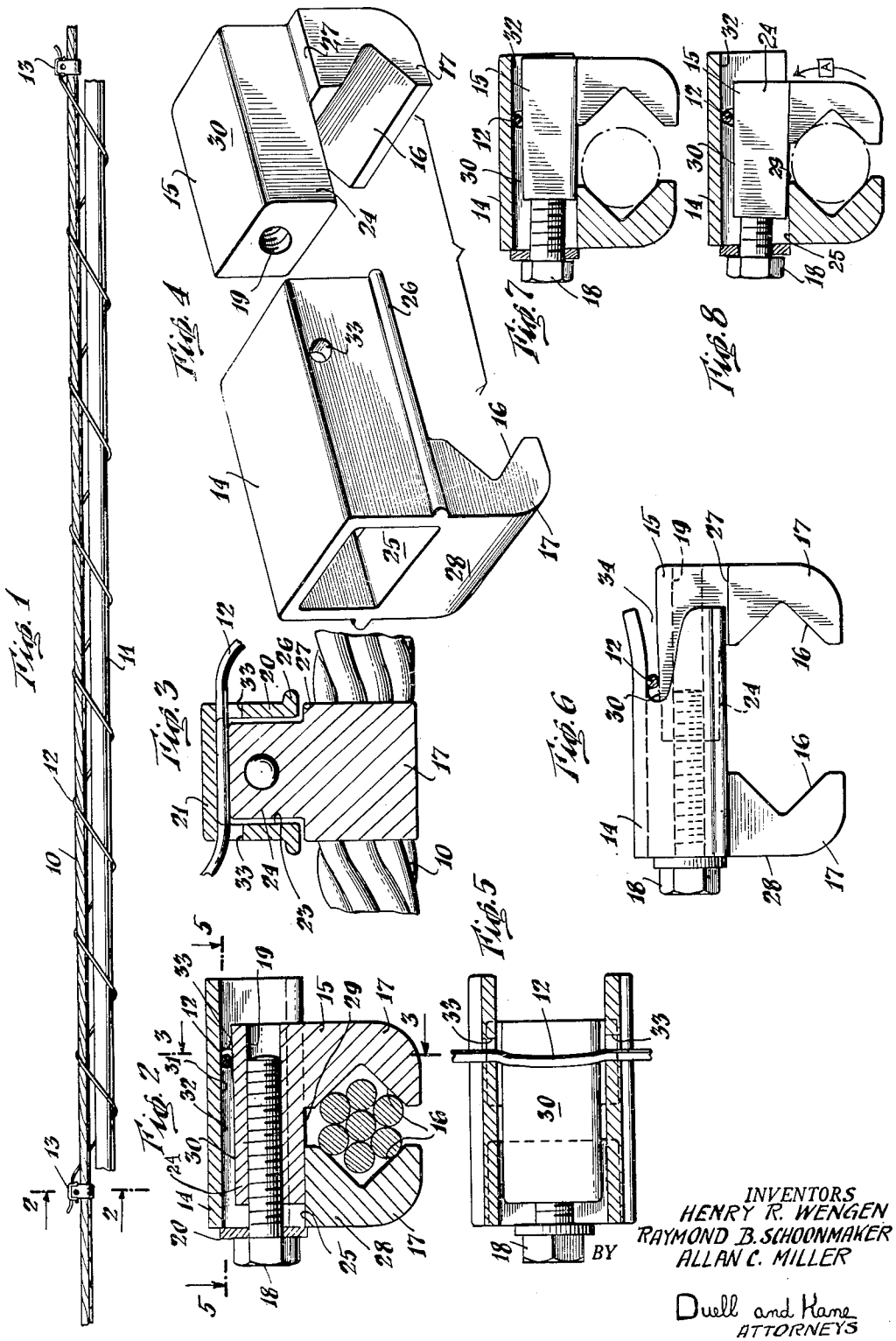
INVENTORS
HENRY R. WENGEN
RAYMOND B. SCHOONMAKER
ALLAN C. MILLER
BY Duell and Kane
ATTORNEYS Patented Mar. 17, 1953

2,631,346

UNITED STATES PATENT OFFICE 2,631,346

MESSENGER WIRE CLAMP

Henry R. Wengen, Allan C. Miller, and Raymond B. Schoonmaker, Poughkeepsie, N. Y., assignors to Fargo Mfg. Company, Inc., Poughkeepsie, N. Y., a corporation of New York Application December 29, 1949, Serial No. 135,554

5 Claims. (Cl. 24—81)

This invention relates to an improved clamp for securing a small diameter wire or strand relative to a large diameter wire or cable.

It is an object of this invention to provide a clamp which clamps a small diameter wire to a large diameter wire.

It is a further object of this invention to provide a clamp which clamps a small diameter wire and a large diameter wire in fixed positions with relation to each other by the same clamping operations.

It is a still further object of this invention to provide a small diameter wire which may be readily inserted through and clamped in one set of jaws in a clamp while a large diameter wire passes through and is clamped in another set of jaws in the same clamp.

These and other objects of our invention will become more apparent upon consideration of the following description taken together with the drawings in which:

Fig. 1 is a schematic view of an aerial cable lashed to a supporting messenger cable;

Fig. 2 is a section of one form of a clamp of this invention;

Fig. 3 is a section of the clamp of Fig. 2 taken on line 3—3 in the direction of the arrows;

Fig. 4 is an exploded view of the clamp of Fig. 2;

Fig. 5 is a top plan view of the clamp of Fig. 2 partly in section;

Fig. 6 is a side elevation of a modification of the clamp of this invention;

Fig. 7 is a section of the clamp of Figs. 2 and 5 in a different position of operation, and Fig. 8 is a section of the clamp of Figs. 2 and 5 in a still different position of operation.

Referring to Fig. 1, a messenger cable 10 is shown supporting an aerial cable 11 by means of lashing wire 12. The lashing wire 12 is looped around both the messenger cable 10 and the aerial cable 11 and drawn tight to bring the aerial cable 11 close to the messenger cable 10. The lashing wire 12 in turn is itself fastened to the messenger cable by a set of clamps 13. The clamps 13 hold the lashing wire in position with relation to the cables 10 and 11 and thus holds the assembly of cables and wire together. Fig. 2 shows clamp 13 is made up of two major parts, they are a female element 14 which receives a male element 15. Each of the elements 14 and 15 are provided with V-shaped faces 16 which are indented into jaws 17 depending from the elements 14 and 15. The faces 16 on the jaws 17 face each other to form the clamping portion of the clamp 13 which grips the cable 10. The elements 14 and 15 are movably fastened together by a bolt 18 running into a hole 19 tapped in the element 15 and bearing against a washer 20 at the end of the element 14. When the bolt 18 is screwed into or out of the tapped hole 19 the elements 14 and 15 are drawn together or released. As shown in the sectional view of Fig. 3, the female element 14 has a roof 21 and two lateral walls 22 which form a guideway 23 to receive the male element 15. The part of the element 14 which is received in the guideway 23 is a block 24. At one end of the guideway 23 the upper surface of the depending jaw 17 forms a floor 25 from one wall 22 to the other wall 22 across the end of the guideway 23 as seen in Fig. 4. The exploded view of Fig. 4 shows how a block 24 which forms the upper part of the element 15 runs in the guideway 23. The lower edge of the lateral walls 22 are flanged out into lips 26 which rest and slide on shoulders 27 formed in the element 14 on each side of the block 24. The jaws of the elements 14 and 15 extend downward from the guideway 23 and the block 24. The block 24 is tapped with the hole 19 and receives the bolt 18 which is inserted through the guideway 23 from the opposite end so that when the washer 20 is rested against the back 28 of the element 14 the block 24 can be moved through the guideway 23. When the block 24 is drawn into the guideway 23 so as to bring the faces 16 of the jaws 17 together a surface 29 on the nether side of the block 24 contacts and slides on the floor 25.

The block 24 as shown in Fig. 2 has a surface 30. This surface 30 may be inclined as shown in Fig. 2 or parallel to a surface 32 on the inside of element 14. The block 24 and the guideway 23 are so shaped that a space 31 is provided between the surface 30 and the inner or nether surface 32 of the roof 21. This space 31 is large enough to permit the lashing wire 12 to be inserted through the clamp through openings 33 in the upper portion of the lateral walls 22 of the element 14. The lashing wire 12 passing through the one opening 33 and the guideway 23 passes over the top surface 30 of the block 24 and out the other opening 33 on the other side. When the clamp 13 is in open position the lashing wire 12 will fit easily through the openings 33 and the space 31.

In the operation of the clamp 13 according to this invention, the clamp 13 is closed by tightening the bolt 18 to draw element 15 into element 14. The jaws 17 are drawn together with the jaw faces 16 converging on the messenger cable 10. While the cable 10 is thus being clamped between the jaws 17 of the elements 14 and 15, simultaneous motion between other surfaces of the elements 14 and 15 brings about clamping of the lashing wire 12. Referring again to Fig. 2, the clamp 13 is closed by drawing the element 15 to the left with relation to the element 14. As the block 24 moves into the guideway 23 the surface 30 bears laterally upon the lashing wire 12 and pushes it against the side of the opening 33 as shown in Fig. 5. At the same time the inclined surface 30 forces the lashing wire 12 against the nether surface 32 of the roof 21. This clamping can be carried to the point where the wire 12 is permanently crimped by the clamping action as shown by the section of lashing wire passing through the clamp 13 in Fig. 5.

The male element 14 exerts a further clamping action on the lashing wire upon the tightening of the clamp 13. This is achieved as a result of a rotational moment which takes place as the jaws 17 bear upon the relatively large cable 10. When the unclamped clamp 13 is in a horizontal position with its jaws 17 depending downward, the male element which fits loosely in the guideway 23 sags so that the block 24 is canted at an angle. In one method of making a secure connection with the clamp 13 this sagging element 15 is held up in the guideway 23 by the assembler in the position shown in Fig. 7. In this position the jaws 17 receive the cable. After the clamp 13 has been placed on the large cable such as cable 10, the element 15 and its jaw 17 again sag with the surface 29 at one end of block 24 resting on surface 25 and the block 24 tilted downward toward its other end. As shown in Fig. 8, however, the cable prevents as greater a degree of sag as when it is absent. The sag is due to the play allowed in the fitting of element 15 into element 14. When the clamp 13 is tightened on the cable 10 the bolt 18 pulls the elements 14 and 15 together and the play between these elements causes the element 15 to acquire rotational movement when its jaw 17 bears against one side of the cable 10 while the jaw 17 of the element 14 bears against the other side. The element 15 has a tendency to rotate in a counterclockwise direction around the axis of the cable 10 as shown by the arrow A in Fig. 8. This counterclockwise movement tilts the outer end of the block 24 upward, moving the element 15 toward the position shown in Fig. 2. The effect of such a rotational moment is to add to the clamping force applied to the lashing wire 12. This is brought about by the leverage that is exerted on the element 15 under these conditions. In tilting the block 24 acts as a lever with the abutment between the surfaces 25 and 29 providing the fulcrum point for the lever. The force is applied by the bolt 18 pulling in the tapped hole 19 to straighten the alignment of the block 24 in the guideway 23. The work of the lever is applied in a squeezing action against the lashing wire 12. By the same rotational movement the bolt 18 is slightly canted so that its head bears more snugly against the lower half of the washer 20.

A modification of the clamp of this invention is shown in Fig. 6. In this modification the lateral walls 22 of the female element 14 are provided with slots 34 cut in the lateral walls 22 from the right side of the female element 14 as seen in Fig. 6. The lashing wire 12 is inserted in this slot 34. The tightening action of the bolt 18 drawing the element 15 into the element 14 brings the clamping jaws 17 together and moves the inclined surface 30 against the lashing wire 12 as described in connection with Figs. 2, 3, 4 and 5.

In the application the device of this invention by clamping a lashing wire in position relative to a messenger cable, the lashing wire is slid up into the slot 34 while the element 15 is drawn far enough out of the guideway 23 to permit the lashing wire to pass up to and fit in the space 29. The bolt 18 is then engaged in the tapped hole 19 and the surface 30 of element 15 brought into engagement with the wire 12. At this point the clamp 13 is inserted in position on the messenger cable 10 and the bolt 18 turned in the tapped hole 19 to draw the element 15 further into the element 14, grasping the messenger cable 10 and tightening the grip on the lashing wire 12. When finally in fully tightened position the clamp 13 holds the lashing wire 12 tightly secured between the surfaces 30 and 32 and the sides of the slots 34. At the same time the jaws 17 grasp and clamp the cable 10.

In addition to the clamping achieved by the jaws 17 and the surfaces 30 and 32, the clamp 13 has other surfaces which may be modified so as to grip the lashing wire 12. The lip 26 and the shoulder 27 on either side of the clamp may be formed to receive the lashing wire 12. Upon tightening the clamp these parts converge under the rotational movement of the male element 15. Similarly openings could be provided through the guideway 23 in the vicinity of the abutment between the surfaces 24 and 25. The rotation of element 15 upon tightening the clamp 13 brings about clamping at this point. Another area in which the tightening clamp 13 could provide gripping is between the lower half of the head of bolt 18 and the back 28 of the element 14. In these areas the gripping action that could be obtained is concomitant with closing the jaws 17 on a messenger cable 10.

Aerial cables such as telephone and power cables are supported above ground to suspension from a stronger cable. The aerial cable or telephone cable is secured to the stronger "messenger" cable by lashing wire which is a small diameter wire that is wrapped around the two cables to hold them close to each other, if not in contiguity. In normal use the two cables are subjected to various forces which tend to separate them, causing the wire to shift in its position. To avoid and prevent this shifting of the lashing wire and to hold the two cables together, the lashing wire is in turn clamped to the messenger wire by a messenger wire clamp. In assembling the lashing wire, the messenger wire and the aerial cable during cable stringing operations, the operator must have a messenger wire clamp which is easy to apply and infallible in operation.

Among other advantages of this invention, the lashing wire is clamped by the same operation that tightens the clamp on the messenger cable 10. The lashing wire is held between jaws which are also integral surfaces of the clamp. The nature of the surfaces and the action between them as the clamp is closed permits large tolerances in the dimensions of the parts while still providing satisfactory clamping strength. These tolerances are actually of further advantages in permitting a rotational movement which provides a clamping action. Still further advantages of the clamp of this invention are the simplicity of manufacture and assembly of the clamps and the rugged nature of their construction which permits rough usage without damage to the operating characteristics of the clamp.

While a clamp with V-groove abutting jaws has been shown in the embodiment of the invention for the purposes of this description, it will be readily appreciated that other primary abutting jaws such as radial jaws may be employed in clamps incorporating this invention. Other adaptations and variations in the clamps embodying the described invention may also be made together with numerous changes in construction and rearrangement of the parts without departing from the spirit of the invention as defined by the claims.

We claim:

1. In a composite clamp for securing a small diameter wire relative to a large diameter wire having a pair of engaging parts and a first set of jaws, one on each of said engaging parts, the combination of a female element forming one of said engaging parts and carrying the first of said jaws, a channel shaped guideway formed in said female element, a male element carrying the second of said jaws and fitable into said guideway of said female element, a first surface in said guideway, a pair of diametric walls adjacent said first surface, an aperture in each of said walls adjacent said first surface for receiving a wire inserted laterally therethrough, a second surface on said male element positionable adjacent said first surface and between said respective apertures, and means for moving said first and second surfaces with relation to each other in the area of said aperture whereby said small diameter wire inserted laterally in said apertures is positioned between said relatively moving first and second surfaces.

2. In an electrical connector for securing together and connecting electrical conductors, a first clamp member including an elongated U-shaped member, comprising a pair of longitudinal diametric walls, a longitudinal wall transverse to and adjoining said diametric walls forming with said diametric walls said U-shaped member, a first jaw mounted on said U-shaped member opposite to said longitudinal transverse wall, apertures formed diametrically in said diametric walls, a surface of said transverse wall lying between said diametric apertures, a second clamp member including an elongated block member fitable in said U-shaped member, a second jaw mounted on said block member, a surface on the opposite side of said block member extending longitudinally of said first member; and means for drawing said block member into said U-shaped member including means for moving said block member surface with relation to said U-shaped member surface through the area between said apertures.

3. In an electrical connector for securing together and connecting electrical conductors, a first clamp member including a pair of longitudinal diametric walls, a longitudinal wall transverse to and adjoining said diametric walls forming with said diametric walls a U-shaped member, a first jaw mounted on said first member laterally across one end of said U-shaped member; a second member including an elongated block member fitted into said channel, a second jaw mounted on one end of said block member; longitudinal slots formed in said pair of longitudinal diametric walls adjacent said longitudinal transverse wall of said first member, a surface on the opposite side of said block member from said second jaw extending longitudinally of said block member; and means for drawing said block member into said channel and positioning said longitudinal surface on said block member adjacent said longitudinal slots.

4. In an electrical connector for securing together and connecting electrical conductors, a first clamp member including an elongated U-shaped member, comprising a pair of longitudinal diametric walls, a longitudinal wall transverse to and adjoining said diametric walls forming with said diametric walls said U-shaped member, longitudinal edges on each of said diametric walls opposite to said transverse wall and a first jaw mounted on said edges laterally across one end of said U-shaped member; a longitudinal slot in each of said diametric walls extending inward into said U-shaped member from a first end thereof and an inner surface of the transverse longitudinal wall; a second clamp member including an elongated block member fitable in said U-shaped member, a second jaw mounted on said block member, and an inclined surface on the opposite side of said block member from said second jaw extending longitudinally of said block member, said inclined surface being fitted in said U-shaped member at an angle to a portion of the inner surface of the transverse longitudinal wall of said U-shaped member; and means for drawing said block member into said U-shaped member including means for moving said inclined surface of said block member with relation to said portion of said transverse wall.

5. In an electrical connector for securing together and connecting electrical conductors, a first clamp member including a pair of longitudinal diametric walls, a longitudinal wall transverse to and adjoining said diametric walls forming with said diametric walls a U-shaped member, longitudinal edges on each of said diametric walls opposite to said transverse wall, a first jaw mounted on said edges laterally across one end of said U-shaped member and a first inner surface on one end of said jaw; a second inner transverse surface on said longitudinal transverse wall facing said first inner surface of said first jaw, apertures diametrically formed in the respective diametric walls adjacent said second inner transverse surface for receiving a wire laterally of said surface and said U-shaped member; a second clamp member including an elongated block member fitable in said U-shaped member, a second jaw mounted on said block member, a third surface on the opposite side of said block member from said second jaw extending longitudinally of said block member, a fourth surface on said block member adjacent said second jaw and abuttable with said first inner surface of said first jaw; and means for drawing said block member into said U-shaped member including means for moving said fourth surface and said first inner surface into abutment and moving said third surface with relation to said second longitudinal transverse surface whereby said second member is simultaneously rotated with relation to and longitudinally drawn into said U-shaped member.

HENRY R. WENGEN.
ALLAN C. MILLER.
RAYMOND B. SCHOONMAKER.

REFERENCES CITED

The following references are of record in the file of this patent:

UNITED STATES PATENTS

| Number | Name | Date |
|---|---|---|
| 1,654,838 | Schroeder | Jan. 3, 1928 |
| 2,044,679 | Frese | June 16, 1936 |
| 2,456,808 | Becker | Dec. 31, 1948 |